No. 643,102. Patented Feb. 13, 1900.
A. M. BATES.
SACKING AND WEIGHING MACHINE.
(Application filed Sept. 20, 1899.)
(No Model.) 6 Sheets—Sheet 1.
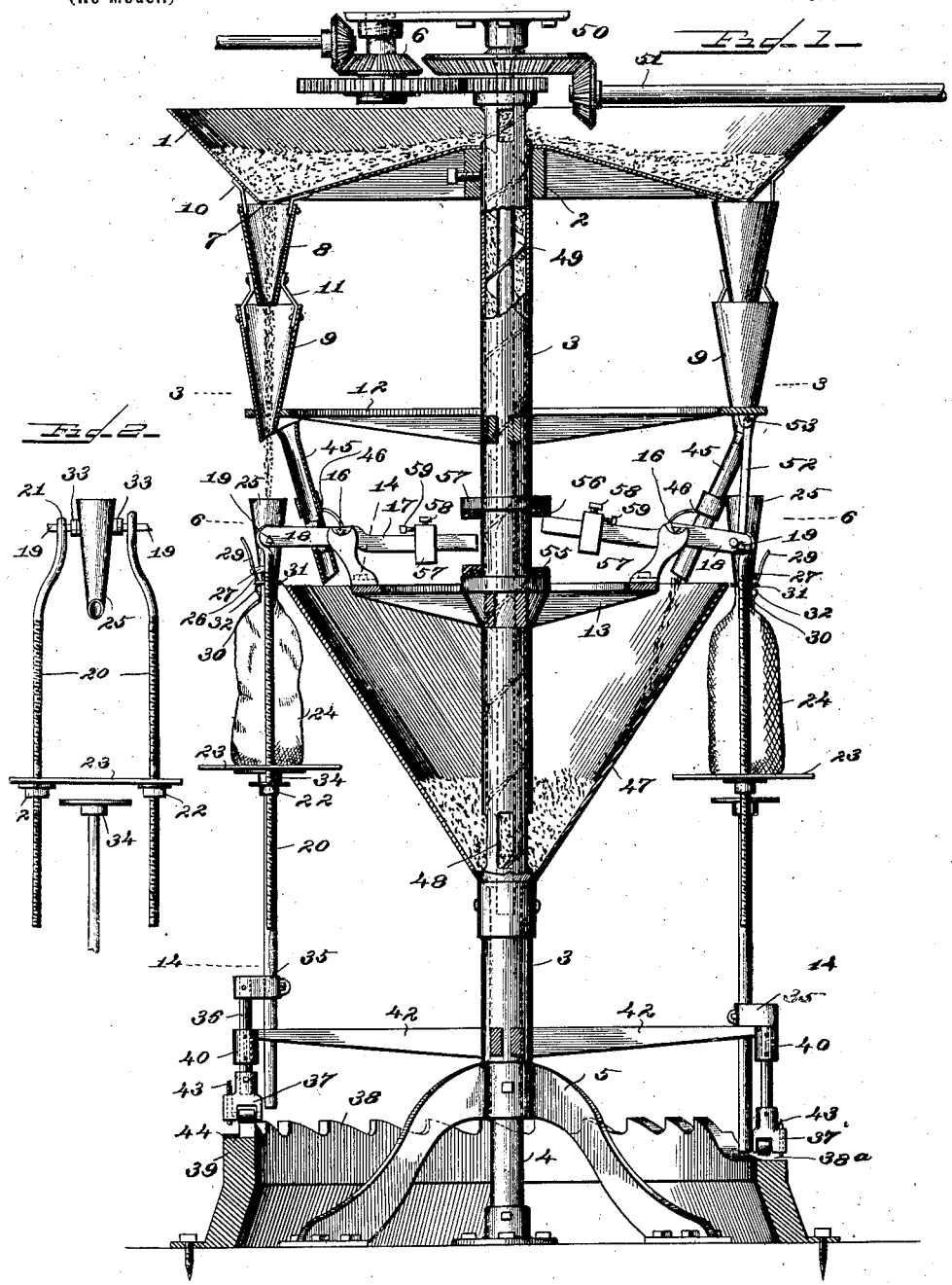

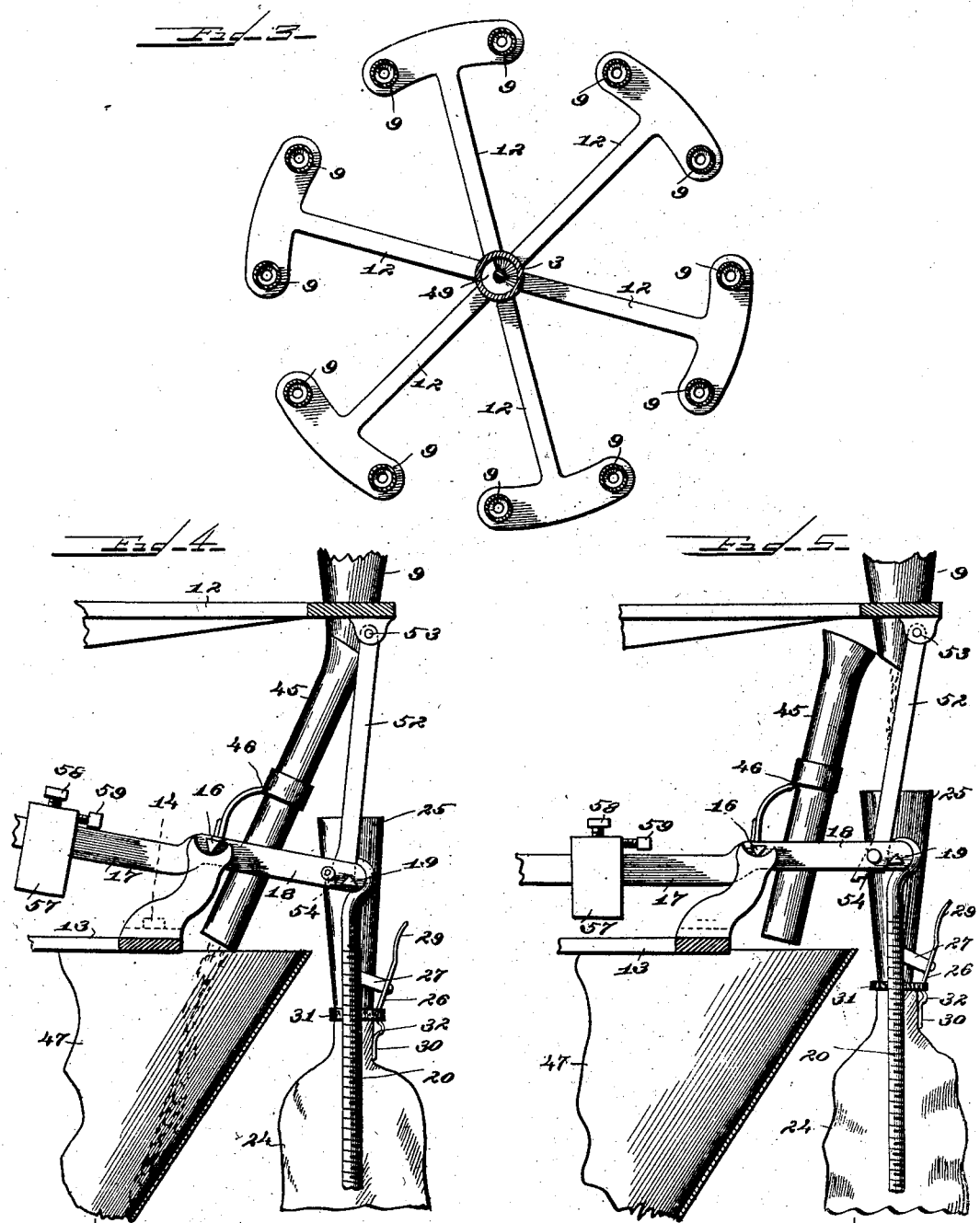

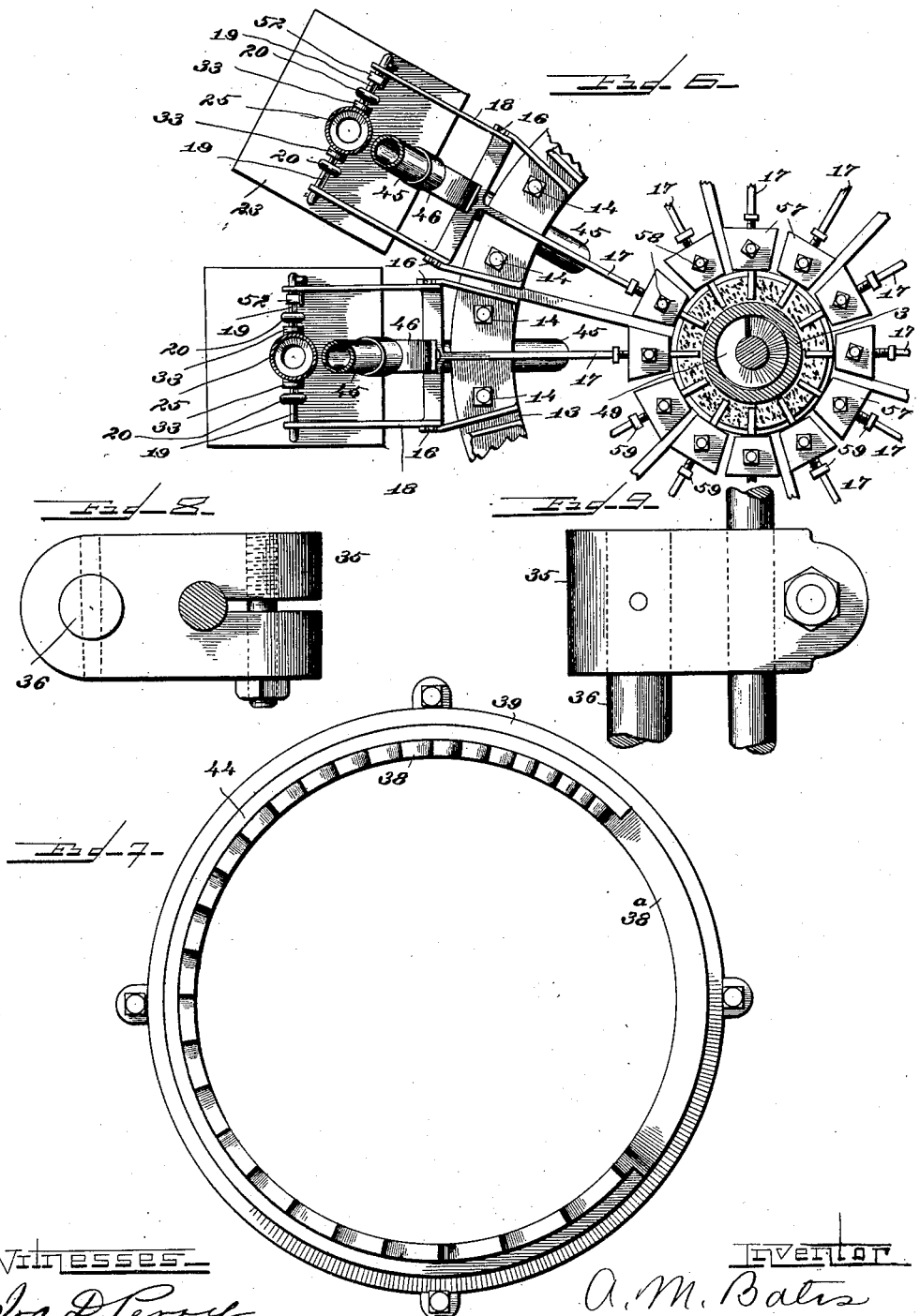

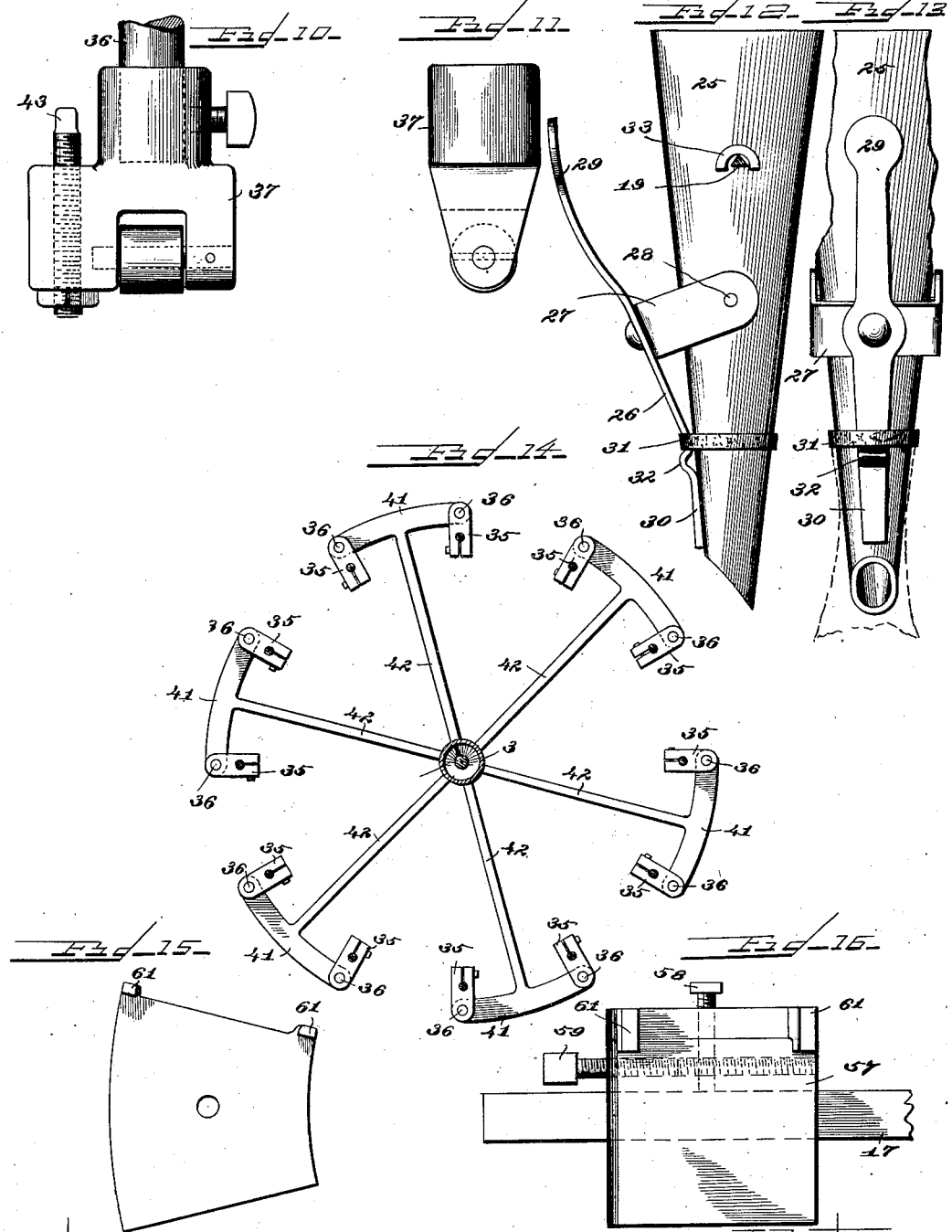

No. 643,102. Patented Feb. 13, 1900.
A. M. BATES.
SACKING AND WEIGHING MACHINE.
(Application filed Sept. 20, 1899.)
(No Model.) 6 Sheets—Sheet 5.
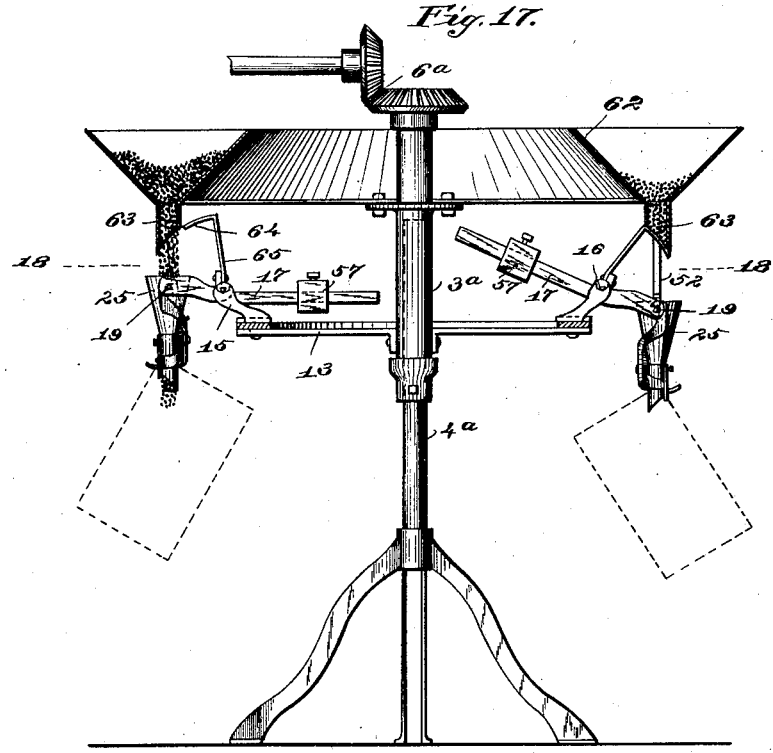
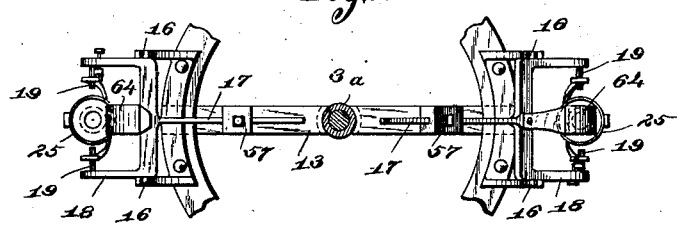
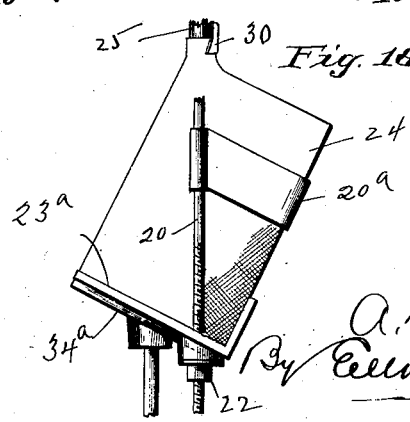
Witnesses:
Inventor:

No. 643,102. Patented Feb. 13, 1900.
A. M. BATES.
SACKING AND WEIGHING MACHINE.
(Application filed Sept. 20, 1899.)
(No Model.) 6 Sheets—Sheet 6.
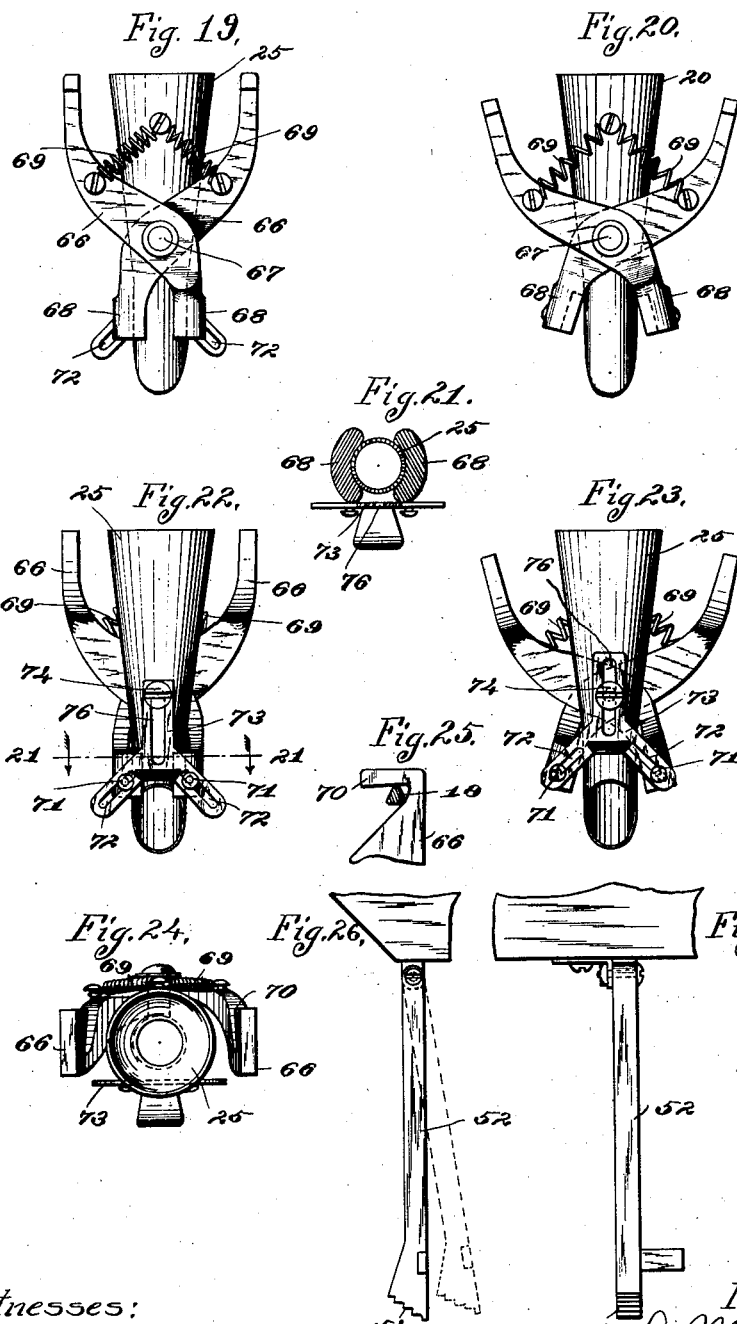

UNITED STATES PATENT OFFICE.

ADELMER M. BATES, OF CHICAGO, ILLINOIS.

SACKING AND WEIGHING MACHINE.

SPECIFICATION forming part of Letters Patent No. 643,102, dated February 13, 1900.

Application filed September 20, 1899. Serial No. 731,037. (No model.)

*To all whom it may concern:*

Be it known that I, ADELMER M. BATES, a citizen of the United States, residing at the Hyde Park Hotel, city of Chicago, county of Cook, and State of Illinois, have invented certain new and useful Improvements in Sacking and Weighing Machines, of which the following is a full, clear, and exact specification.

My invention relates to machines for automatically filling bags or sacks with a predetermined weight of material; and it has for its primary object to provide a simple and efficient machine for accomplishing this end with the maximum degree of accuracy and despatch.

Another object of my invention is to fill the bag or sack compactly, so that bags of minimum size may be employed for the maximum weight of material.

With these ends in view my invention consists in certain features of novelty in the construction, combination, and arrangement of parts by which the said objects and certain other objects hereinafter appearing are attained, all as fully described, with reference to the accompanying drawings, and more particularly pointed out in the claims.

In the said drawings, Figure 1 is a side elevation of my improved machine, partly in section and partly broken away. Fig. 2 is an enlarged detail view showing the bag-support, filling-funnel, and jigging-plunger hereinafter described. Fig. 3 is a detail plan section taken on the line 3 3, Fig. 1, showing the spider for supporting the chutes, the parts below the same being omitted from the view for the sake of clearness. Fig. 4 is an enlarged side elevation of the weighing mechanism and contiguous parts, showing the scale weighed down and the stream diverted from the bag-funnel. Fig. 5 is a similar view showing the stream passing into the bag-funnel. Fig. 6 is a detail plan section, on an enlarged scale, taken on the line 6 6, Fig. 1. Fig. 7 is a detail plan view of the corrugated or toothed jigging-ring hereinafter described. Fig. 8 is an enlarged detail view of a clip hereinafter described for connecting the jigging-plunger with its operating-stem. Fig. 9 is a side elevation thereof. Fig. 10 is a side elevation of the jigging-trolley hereinafter explained. Fig. 11 is another view of the same, taken at right angles to the view in Fig. 10. Fig. 12 is an enlarged detail view of the bag-filling funnel and holder. Fig. 13 is a similar view looking at right angles to the view in Fig. 12. Fig. 14 is a plan section taken on the line 14 14, Fig. 1. Fig. 15 is a detail view of an auxiliary weight hereinafter described. Fig. 16 is a side elevation of the weight and a part of the scale-beam. Fig. 17 is a side elevation, partly in vertical section, of a modified form of machine. Fig. 18 is a detail plan section taken on the irregular line 18 18, Fig. 17. Fig. 18$^a$ is a further modification showing an inclined bottom for supporting the bag when the latter is held by the corner. Fig. 19 is a front elevation of a modified form of bag holder and funnel, showing the holding-jaws closed. Fig. 20 is a similar view showing the jaws open. Fig. 21 is a transverse section taken on the line 21 21, Fig. 22. Fig. 22 is a view of the bag-holding funnel looking from the opposite side to that presented in Figs. 19 and 20. Fig. 23 is a similar view showing the jaws open. Fig. 24 is a plan view thereof. Fig. 25 is a detail view showing the upper end of one of the supporting-hooks of the bag-holder resting on its support. Fig. 26 is a side elevation of a lag-bar or stop hereinafter described, and Fig. 27 is a front view thereof.

Like signs of reference indicate like parts throughout the several views.

The bag to be filled is preferably constructed with a small filling-aperture adapted to receive the end of a filling funnel or tube, so that after the bag has received the requisite amount of material it may be ready for shipment or storage without further regard for closing the filling-aperture; but it will nevertheless be understood that while the described form of bag, which constitutes the subject-matter of the claims in United States Letters Patent No. 623,198, issued to me on the 18th day of April, 1899, is preferable, my machine is nevertheless adapted for use with any form of bag or receptacle.

In filling bags with granular material—such as salt, sugar, flour, coffee, &c.—it is often necessary to agitate or jostle the bag while the material is running in in order that the bag may receive its full capacity and all the corners thereof be completely filled out. To the end, therefore, that this object may be accomplished, I support the bag to be filled upon a table or platform which is subjected to the constant agitation, during the greater part of the filling process, of a jigging apparatus, while the neck of the bag is supported by a funnel having irregular support upon a scale, and this funnel is arranged under a chute through which the material is supplied to the funnel, but which chute is automatically closed by a cut-off controlled by the scale-beam when the requisite weight is attained, and when once cut off it is held so by a lag-bar or lock adapted to be automatically released when another bag is placed in position.

Referring now more particularly to the view of the invention shown in Figs. 1 to 16, inclusive, 1 represents a hopper having its central portion convexed, so as to make its bottom incline toward its outer edges and into which hopper the material to be sacked is placed. This hopper is supported upon a collar 2, which in turn is secured to the upper end of a hollow shaft or tube 3, journaled upon a vertical stud-shaft 4 and supported by a pedestal 5, whereby the tube 3, together with the hopper 1, may revolve by any suitable train of gearing 6.

The hopper 1 is provided in its bottom at suitable intervals with discharge-openings 7, and secured beneath these are the chutes which direct the material to the bag-funnels hereinafter described. It is found that in filling bags after this fashion with salt and similar granular material the same will not run freely through a tube that is closed from end to end, and in order to obviate this difficulty I constitute each of these chutes of a number of funnel-shaped sections 8 9, the former being secured by suitable hangers 10 to the bottom of the hopper 1 and the latter by hangers or brackets 11 to the lower end of the former in such a way that the lower end of the upper funnel 8 will discharge into the upper end of the lower funnel 9, leaving a space around the lower end of the funnel 8 for the admission of air to the stream as it falls through the funnels. The lower ends of the funnels 9 may also be supported and steadied by spider-arms 12, secured to the tube 3. In the accompanying drawings I have shown and described chutes as composed each of two of the funnels 8 9; but it will nevertheless be understood that the number is unlimited and governed only by the distance which the material has to fall.

Secured to the tube 3 at a point below the spider 12 is another and smaller spider 13, upon which is fastened by means of bolts 14 or other suitable devices a number of brackets 15, each pair of which supports the knife-edge bar 16 of a scale-beam 17, such scales being equal in number to the number of chutes 8 9 employed and arranged approximately under the latter. The forward or outer end of the scale-beam 17 is forked, as shown more clearly at 18 in Fig. 6, and each of these forks is provided with a pair of short knife-edges 19, which project inwardly or toward each other and which serve for the suspension of the bag-support, which consists of a pair of hangers or bails 20, having their upper ends hooked, as shown at 21, so as to engage over the knife-edges 19. The lower ends of the rods 20 are screw-threaded and provided with adjustable lugs 22, which serve to support a platform or table 23, through which the rods 20 pass, such table serving for the support of the bag 24 during the filling and weighing operation. Located between the rods or bails 20 is a bag filling and supporting funnel 25, whose lower end or neck is adapted to be inserted through a small aperture, if required, while the upper end is sufficiently enlarged to receive the stream as it falls from the funnel 9. This bag-filling funnel 25 is provided with a clip or clamp 26, secured to a yoke 27, which is pivoted at 28 to the side of the funnel, so that by pressing upon the thumb-piece 29 of the clip the lower clamping end 30 thereof may be released from the bag. As a convenient means of pressing the clip against the bag I employ a rubber band 31, which passes around the funnel and the clip just above a shoulder or stop 32, formed on the clip by bending the latter, thus preventing the rubber band from slipping off. It is my purpose in the use of these bag-filling funnels 25 to insert the funnel and secure it to the bag before the bag is put in place on its support 23, the operator being provided with a supply of the funnels 25, so that they may be attached to the bags in advance and ready for instant application to the machine. The funnels 25 are supported while receiving the supply from above by lugs 33, secured on opposite sides thereof and fitting downwardly over the knife-edges 19, so that they may be readily removed, together with the bag, by lifting upwardly to disengage the lugs 33 from the knife-edges 19.

With many forms of material—such as salt, sugar, flour, &c.—it is impossible to completely fill the bag by allowing it to discharge thereinto through a comparatively small opening without agitating the bag, and in order that this may be accomplished automatically as the bag is being filled and its contents weighed I arrange under each of the platforms 23 a jigging-plunger 34, having a stem adjustably supported in a clip 35, which in turn is secured to a vertical stem 36, carrying a trolley or antifriction-roller 37 at its lower end, which rests upon a toothed or corrugated way 38, formed on a base-ring 39, which is preferably supported independently of the pedestal 5, so that the jar will not be communicated to the weighing mechanism of the machine. The stems 36 rise and fall in suitable keepers or boxes 40, formed on the cross-arms 41 of a spider 42, which is secured to the tube 3 and revolves therewith, so that as the weighing mechanism and bag-supports revolve the jigging-plungers 34 will be rapidly vibrated against the under sides of the platforms 23, lifting the latter, together with the bag, and then descending a sufficient distance to permit the platform to seek its own support upon the lugs 22, so as to communicate the weight of the bag to the scale. The degree of vibration of this jigging mechanism may be regulated at will by the vertical adjustment of set-screws or stops 43, secured in each of the brackets of the trolleys 37 and adapted to impinge a steel ring 44, supported on the ring 39, so that by turning down the screws 43 the trolleys 37 will be prevented from descending to the entire depth of the notches in the way 38. As the weight nears attainment the rear end of the scale-beam 17 rises and the stream falling from the funnel 9 is gradually shut off by a diverting-chute 45, suppported by bracket 46 on the scale-beam, thus diverting the material from the funnel 9 and directing it into a hopper 47, which is common to all of the chutes 45 and which is supported on and revolves with the tube 3. As the material falls into the hopper 47 it enters the tube 3 through apertures 48 and is conducted up again into the hopper 1 by means of a vertical screw conveyer 49, rotated in the tube 3 by means of a gear 50, deriving motion from a shaft 51. The purpose of thus diverting the stream of material in preference to ejecting it is to avoid permitting the material to crowd or jam in the chute 8 9, which would be the case with material, such as salt, sugar, flour, meal, &c.; but with the diverting-chute 47 the velocity and open character of the stream is maintained and this objectionable jamming of the material and clogging of the tubes and funnels is prevented. As the filling of the bag nears completion it is desirable that the ejecting motion cease in order that there may be nothing to interfere with the accurate operation of the scale, and to this end I discontinue the toothed or corrugated way 38 on one side of the ring 39, as shown in Fig. 7, so that when the trolley 37 reaches this mutilated portion of the way 38 the bag will rest continually upon its support 23 and gradually weigh the beam down and draw the diverting-chute 45 under the funnel 9. As the beam weighs down a lag-bar 52, pivoted at 53 to the under side of the spider 12 adjacent to each of the scales, gradually falls over one of the knife-edges 19 on each of the scales, and thus holds the scale-beam elevated and the diverting-chute 45 coincident with the funnel 9 after the bag and funnel 25 are removed. The lower end of this lag-bar 52 is inclined and provided with a series of notches 54, as better shown in Fig. 5, so that the knife-edge 19 will be caught and held notwithstanding any variation in the extent to which the bag descends. When the funnel 25, with a new bag, is replaced on the knife-edges 19, the lag-bar 52 is readily and invariably released by contact with the hand of the operator and the scale-beam thereupon descends to its normal position, the tail end thereof resting upon an annular cushion 55, supported on the spider 13, and when the scale-beam rises it strikes an upper cushion 56, secured to ring 57 on the tube 3.

57 are the weights on the scale-beams. These are provided with set-screws 58, whereby they may be locked in position when properly adjusted; but it is found in practice that it is practically impossible to turn up the set-screws 58 without forcing the weights 57 slightly out of adjustment. In order that this discrepancy may be compensated for, I provide the weights 57 with compensating weights 59 in the form of horizontal set-screws threaded in the weights, so that they may be screwed back and forth for bringing the center of gravity of the weight nearer to or farther from the center of oscillation. The set-screws 58 may also be employed for holding additional weights 60, arranged on the main weight 57, and having lugs 61 for holding them against rotation on the screws 58.

In the use of the machine the operator is supposed to sit near the mutilated portion 38$^a$ of the corrugated way 38.

In Figs. 17 and 18 of the drawings I have shown the machine appropriate for filling bags with such material as shot and other substances that flow easily. In this machine 62 represents an annular hopper, V-shaped in cross-section, from whose inclined bottom depend a number of tubes 63, whose lower ends are sheared off on the arc of a circle, and this arc has the same radius as a cut-off 64, supported by arm 65 on the scale-beam 17, so that as the beam weighs down the curved cut-off 64 will come under and accurately close the lower end of the tube 63, shutting off the flow of the material into the bag-filling funnel 25, which may be arranged directly under the tube 63 without the interposition of the funnels 8 9, heretofore described. The scales are supported on the spider 13, as heretofore described, which in turn is supported on a tube 3$^a$, journaled on a vertical shaft or standard 4$^a$ and revolved by gears 6$^a$, together with the hopper 62.

In order to prevent the trolleys 37 from falling into the teeth of the track 38 with regular cadence and producing objectionable and severe jar, I make the teeth of said track of different lengths, as shown in Fig. 7, the shorter teeth shown at the top of the figure being at the end of the track, where the bag is put on empty, so that the rapid vibrations will occur while the bag contains but a small quantity of material, it being understood that with this arrangement the trolleys on one side of the track will rise and fall at longer periods apart than those on the other side, and hence unison of movement will be prevented.

In Figs. 19 to 25, inclusive, I have shown a modification of the means for clamping the bag to the filling-funnel 25. This consists of a pair of cross-arms 66, pivoted together at 67, and having gripping-jaws 68 at their lower ends, which come against opposite sides of the neck of the funnel, the upper ends of the arms 66 being drawn together by spiral springs 69 and are provided with hooks 70, whereby the funnel may be hung upon the knife-edges 19. Each of the jaws 68 is provided with a pin or stud 71, which runs in an inclined slot 72, formed in a plate 73, secured by set-screw 74 to the bag of the funnel 25, the set-screw 74 passing through a slot 76 in the plate 73, so that when the upper ends of the arms 66 are drawn together the jaws 68 will be caused to move upwardly and inwardly against the funnel for clamping the bag. With this form of machine the bag may be supported entirely by the clamping-jaws 68, as it is unnecessary to agitate the bag during the filling operation.

In Fig. 18$^a$ of the drawings I have shown the bag-support 23, there designated as 23$^a$, in the form of a trough, so that when the bag is held by the corner while being filled, as in this figure, the bag-support or platform 23$^a$ will conform to the bottom of the bag. I have also shown the bail arms or rods 20 provided with a strap 20$^a$, which extends behind the bag and against which the latter rests, thus forming a better support for the top of the bag and preventing the jigging motion from pulling it loose from the filling-funnel. In order to better conform to the shape of the bag-support 23$^a$, the plunger 34$^a$ in this form is set on an incline, as shown.

Having thus described my invention, what I claim as new therein, and desire to secure by Letters Patent, is—

1. In a bag-filling machine the combination of a revolving hopper, a plurality of chutes leading downwardly therefrom, a plurality of weighing devices supported under said chutes and revolving with said hopper, a diverting-chute supported upon each of said weighing devices for diverting the material from the bag, a hopper for receiving the diverted material, a hollow shaft extending between the two said hoppers and having openings communicating therewith and a screw conveyer in said shaft for conveying the material from the lower to the upper hopper, substantially as set forth.

2. In a bag-filling machine the combination of a vertical revolving tube, a hopper supported thereon and revolving therewith, a second hopper supported upon said tube below said first hopper and having communication with the interior of said tube, chutes leading downwardly from said first hopper, bag weighing and supporting devices supported upon and revolving with said tube, diverting-chutes for diverting the material from the bags into said second hopper and a screw conveyer in said tube for elevating the material from the lower hopper to the upper hopper, substantially as set forth.

3. In a bag-filling machine the combination of a plurality of revolving weighing devices, a vertically-movable platform or bag-support suspended from each of said weighing devices, a toothed or corrugated way, a plurality of trolleys running on said way and plungers operatively connected with said trolleys for agitating said bag-supports, substantially as set forth.

4. In a bag-filling machine the combination of a plurality of revolving weighing devices, a vertically-movable bag-support suspended from each of said weighing devices, a jigging-plunger arranged under each of said supports, a trolley connected with each of said plungers, a toothed way arranged under said trolleys, means for traveling said trolleys along said way and means for varying the degree of downward movement of said trolleys, substantially as set forth.

5. In a bag-filling machine the combination of a chute for conveying the material to the bag, a weighing device for weighing the bag, a cut-off actuated by said weighing device for preventing the material from entering the bag after the weight has been attained and a pivoted lag-bar having a surface normally lagging against a surface moving in unison with the weighing device adapted to engage therewith when the weighing device weighs down for holding said cut-off in its operative position, one of said surfaces being inclined so that the lag-bar will engage and hold the weighing device at various degrees of depression of the weighing device, substantially as set forth.

6. In a bag-filling machine the combination of a chute for conveying the material to the bag, a scale for weighing the bag, a cut-off for preventing the material from entering the bag after the weight has been attained and a toothed lag-bar normally tending to engage over a part of the weighing device and holding the chute closed after the bag has been removed, substantially as set forth.

7. In a bag-filling machine the combination of a chute for conveying the material to the bag, a scale having a beam, a bag-support on said scale for supporting and weighing the bag, a bag-filling funnel removably supported on said beam and having means for attachment to the bag, substantially as set forth.

8. In a bag-filling machine the combination of a chute for conveying the material to the bag, a scale for weighing and supporting the bag having the knife-edge bar 19, a cut-off for said chute, a lag-bar resting normally against said knife-edge bar 19 and having an inclined notched end for engaging thereover as the bar 19 descends, substantially as set forth.

9. In a bag-filling machine the combination of a scale, a bag-filling funnel having means for gripping the bag and means in connection with said funnel and scale whereby the funnel may be removably supported upon the scale and means for directing the material into said funnel, substantially as set forth.

10. In a bag-filling machine the combination of a scale, a bag-support suspended therefrom and a bag-filling funnel having means for gripping the bag and adapted to be supported independently of said bag-support, substantially as set forth.

11. In a bag-filling machine the combination of a scale, a bag-support suspended from said scale, means for jigging said support independently of the scale, and a bag-filling funnel having means for gripping the bag, supported on the scale independently of said bag-support, substantially as set forth.

12. In a bag-filling machine the combination of a bag-support, a traveling trolley, a track upon which said trolley travels having teeth or serrations of different lengths, means for imparting the jigging movement of said trolley to the bag resting on said support and means for filling the bag, substantially as set forth.

13. In a bag-filling machine the combination of a traveling bag-support, a trolley traveling with said support, a track upon which said trolley runs having teeth of different lengths, means for imparting the jigging movement of said trolley to the bag on said support and means for filling the bag, substantially as set forth.

14. In a bag-filling machine the combination of a series of traveling gravitating trolleys, a track upon which said trolleys travel having teeth or serrations of different size, a series of bag-holding devices traveling with said trolleys and means for imparting the jigging movement of said trolleys to the bags held by said holding devices respectively, substantially as set forth.

ADELMER M. BATES.

Witnesses:
F. A. HOPKINS,
EDNA B. JOHNSON.